United States Patent
Spencer

(10) Patent No.: US 6,984,358 B2
(45) Date of Patent: Jan. 10, 2006

(54) DIFFUSION BONDING PROCESS OF TWO-PHASE METAL ALLOYS

(75) Inventor: William R. Spencer, Longwood, FL (US)

(73) Assignee: Lockheed Martin Corporation, Bethesda, MD (US)

(*) Notice: Subject to any disclaimer, the term of this patent is extended or adjusted under 35 U.S.C. 154(b) by 253 days.

(21) Appl. No.: 10/242,451

(22) Filed: Sep. 13, 2002

(65) Prior Publication Data

US 2004/0050912 A1 Mar. 18, 2004

(51) Int. Cl.
C22C 5/04 (2006.01)
B32B 15/00 (2006.01)
C25D 5/10 (2006.01)

(52) U.S. Cl. .................. 420/463; 428/665; 228/245; 228/182

(58) Field of Classification Search .............. 228/122.1, 228/124.5, 245, 262.1, 262.9, 182, 56.3, 228/903; 420/463, 82, 435, 456; 428/665
See application file for complete search history.

(56) References Cited

U.S. PATENT DOCUMENTS

| | | | | |
|---|---|---|---|---|
| 2,958,937 A | * | 11/1960 | Wagner | 428/557 |
| 3,110,101 A | | 11/1963 | Kieffer et al. | |
| 3,276,113 A | | 10/1966 | Metcalfe et al. | |
| 3,386,159 A | * | 6/1968 | Milch et al. | 228/124.1 |
| 3,577,233 A | * | 5/1971 | Gamer | 420/508 |
| 3,657,801 A | | 4/1972 | Hershenson | |
| 3,714,702 A | | 2/1973 | Hammond | |
| 3,932,880 A | * | 1/1976 | Nara et al. | 257/486 |
| 4,281,041 A | * | 7/1981 | Koehler | 428/336 |
| 4,515,610 A | | 5/1985 | Bhatti | |
| 4,572,925 A | * | 2/1986 | Scarlett | 174/257 |
| 4,605,599 A | | 8/1986 | Penrice et al. | |
| 4,710,235 A | | 12/1987 | Scruggs | |
| 4,736,400 A | * | 4/1988 | Koller et al. | 378/125 |
| 4,736,883 A | | 4/1988 | Morgan et al. | |
| 4,793,969 A | | 12/1988 | Johnson et al. | |
| 5,318,217 A | | 6/1994 | Stinson et al. | |
| 5,360,991 A | * | 11/1994 | Abys et al. | 257/666 |
| 5,370,753 A | * | 12/1994 | Lees et al. | 148/536 |
| 5,530,228 A | | 6/1996 | Burnett et al. | |
| 5,645,747 A | | 7/1997 | Matsen et al. | |
| 5,675,177 A | * | 10/1997 | Abys et al. | 257/666 |
| 5,683,822 A | | 11/1997 | Hasegawa et al. | |
| 5,699,955 A | | 12/1997 | Shimizu et al. | |
| 5,704,538 A | | 1/1998 | Mittendorf | |

(Continued)

OTHER PUBLICATIONS

William R. Spencer, U.S. patent application No. 10/453,542, filed Jun. 4, 2003, entitled "*Method of Liquid Phase Sintering a Two–Phase Alloy*".

Primary Examiner—Stanley S. Silverman
Assistant Examiner—Colleen P. Cooke
(74) Attorney, Agent, or Firm—Burns, Doane, Swecker & Mathis, L.L.P.

(57) ABSTRACT

A method for producing diffusion bonds between components formed of tungsten heavy alloy (WHA) uses aid material to accelerate diffusion across the joint surfaces. The aid material consists of an alloy of palladium (Pd) with one or more of the secondary elements of nickel (Ni), iron (Fe), or cobalt (Co). The secondary elements are selected to correspond to the secondary elements present in the components. The diffusion bonding is carried out by placing diffusion aid material between the joint surfaces of adjacent components, applying a pressure across the joint surfaces, and processing the assembly through a thermal profile. Structures of WHA with complex shapes, interior volumes and/or large sizes can be formed. The joint properties are equal to or superior to those of the parent material of the components.

17 Claims, 2 Drawing Sheets

U.S. PATENT DOCUMENTS

Figure 1:
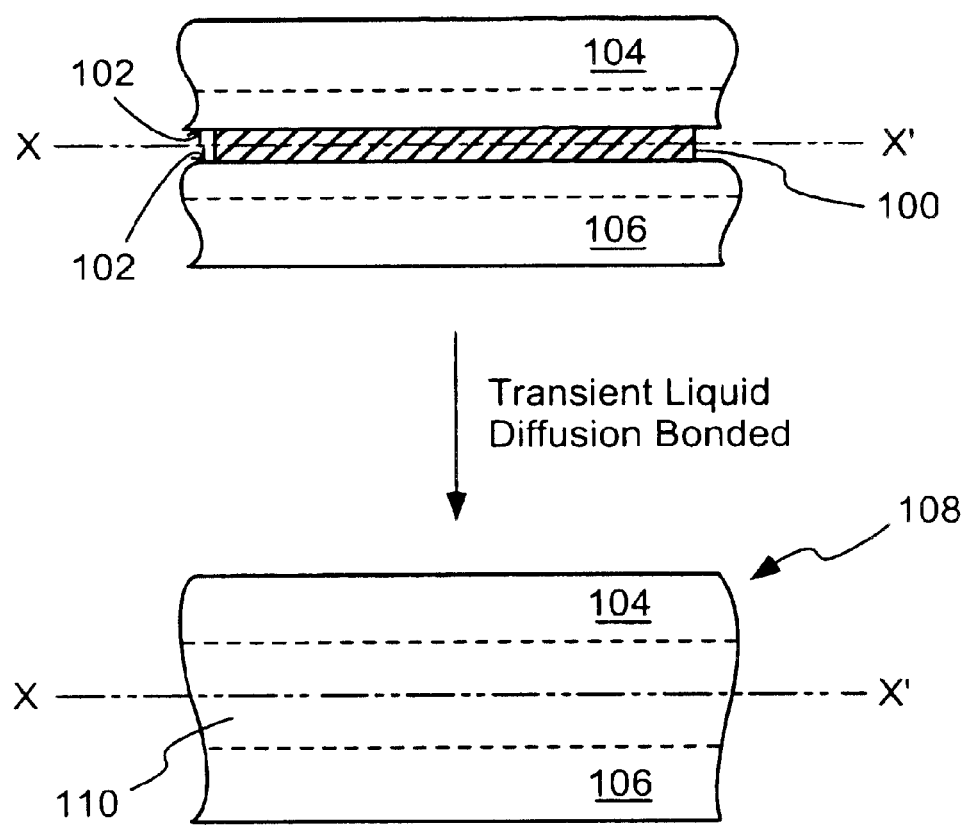

| | | | |
|---|---|---|---|
| 5,759,300 A | 6/1998 | Hasegawa et al. | |
| 5,760,378 A | 6/1998 | Christian et al. | |
| 5,950,064 A | 9/1999 | Robinson et al. | |
| 6,068,813 A | 5/2000 | Semel | |
| 6,071,130 A * | 6/2000 | Johnson | 439/92 |
| 6,136,105 A | 10/2000 | Spencer | |
| 6,156,093 A | 12/2000 | Spencer | |
| 6,335,107 B1 * | 1/2002 | Abys et al. | 428/680 |
| 6,402,893 B2 | 6/2002 | Lumiala et al. | |
| 6,413,294 B1 | 7/2002 | Spencer | |
| 6,517,893 B2 * | 2/2003 | Abys et al. | 427/96 |

* cited by examiner

US 6,984,358 B2

DIFFUSION BONDING PROCESS OF TWO-PHASE METAL ALLOYS

STATEMENT REGARDING FEDERALLY SPONSORED RESEARCH OR DEVELOPMENT

At least some aspects of this invention were made with Government support under contract no. F08630-96-C-0042 DMCPW. The Government may have certain rights in this invention.

BACKGROUND

1. Field of the Invention

The present invention relates to diffusion bonds between components formed of two-phase metal alloy. More particularly, the present invention relates to a palladium-based aid material and a process for using the palladium-based material to form a diffusion bond between components formed of a tungsten heavy alloy.

2. Background Information

Large size and/or geometrically complex two-phase metal alloy materials, such as tungsten heavy alloy (WHA), are difficult to produce as a single piece. Accordingly, multiple two-phase metal alloy parts of uniform composition and properties can be joined to form a larger and/or a complex structure. However, problems in producing such parts arise from high machining costs to produce intricate shapes or limitations of the liquid phase sintered (LPS) consolidation process, such as maximum furnace size, severe slumping of parts, runout of liquid phase matrix material, and substantial compositional variation over the part height due alloying elements, such as solid tungsten particles in WHA, settling under gravity.

Materials, such as copper, have been previously used to join WHA materials. For example, U.S. Pat. No. 4,736,883 describes the joining of parts formed of WHA materials containing Ni, Fe, and/or Cu by diffusion bonding using a foil aid material of pure Cu or a Cu-based alloy. However, copper does not alloy with tungsten. This results in the rejection of tungsten from the parent material matrix in the bond region and the undesirable growth of large tungsten grains, and thus, an overall weaker bond between the parts formed of WHA materials. Similar difficulties can be encountered with other two-phase alloy materials.

Other joining processes and materials are known. For example, a solid-state diffusion bonding process is disclosed in U.S. Pat. No. 3,714,702; reactive brazing processes and brazing processes are disclosed in U.S. Pat. Nos., 3,276,113 and 5,704,538, and welding processes are disclosed in U.S. Pat. No. 3,110,101.

It would be desirable to improve the joining of thinner, smaller, and/or simpler components of WHA materials to form a monolithic structure with uniform properties.

SUMMARY OF THE INVENTION

An exemplary method of making a composition for bonding to a two-phase alloy, the two-phase alloy comprising at least one secondary element, comprises selecting at least one secondary element from the group consisting of Ni, Co, and Fe, the at least one secondary element corresponding to the secondary element in the two-phase alloy and forming a palladium-based alloy comprising 12–93 wt. % palladium and the balance the selected secondary element. Palladium is present in the palladium-based alloy in an effective amount to lower a melting temperature of the palladium-based alloy below a melting temperature of the two-phase alloy.

An exemplary structure comprises a first component and a second component, each component formed of a two-phase alloy. A bond is located between the first and second components and comprises 12–93 wt. % palladium and the balance at least one secondary element selected from the group consisting of Ni, Co, and Fe.

An exemplary method joins a first component and a second component, each component formed of a two-phase alloy. The method comprises preparing a surface on each of the first component and second component, disposing a material comprising a diffusion aid on the first surface of at least one of the first component and the second component, assembling the first surfaces of the first and second components proximate each other with the diffusion aid therebetween to form an assembly, and conducting a thermal treatment on the assembly to form the structure. The diffusion aid comprises 12–93 wt. % palladium and balance at least one secondary element selected from the group consisting of Ni, Co, and Fe.

BRIEF DESCRIPTION OF THE DRAWING FIGURES

Other objects and advantages of the invention will become apparent from the following detailed description of preferred embodiments in connection with the accompanying drawings in which like numerals designate like elements and in which:

FIG. 1 schematically illustrates the transient liquid diffusion bonding process between a first component and a second component.

Figure 2:
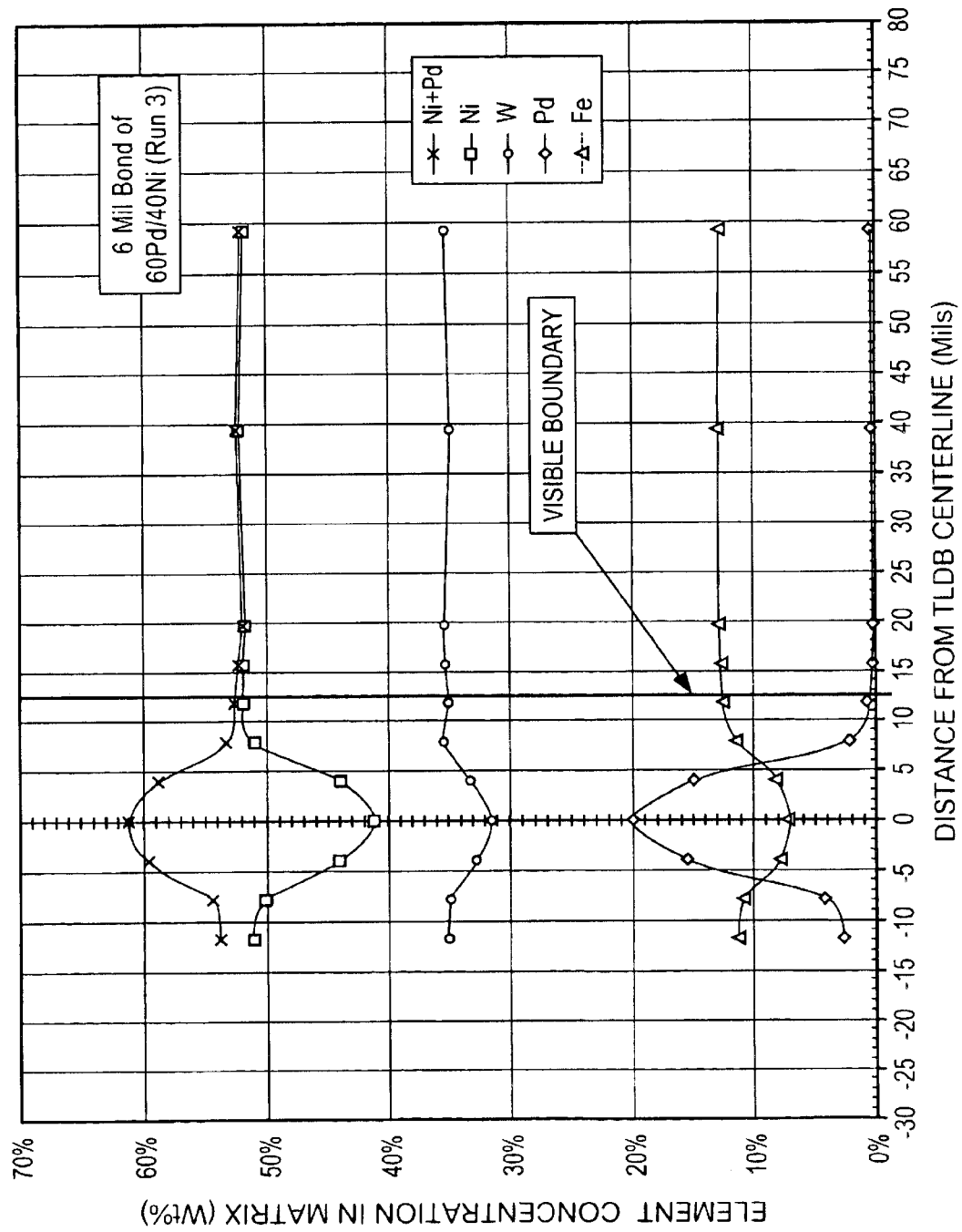

FIG. 2 shows the variation in composition across the bonding region of a of a transient liquid diffusion bond in a structure formed of two WHA components.

DETAILED DESCRIPTION OF THE INVENTION

A palladium-based (Pd-based) alloy diffusion aid material joins components of two-phase material at adjoining surfaces by transient liquid diffusion bonding. During an exemplary process, the diffusion aid melts and the matrix alloy of the two-phase material of each respective component in the bonding region diffuses toward each other to bond the components at the interface to form a structure.

FIG. 1 schematically illustrates an exemplary transient liquid diffusion bonding process. The diffusion aid 100, here represented by a foil, is placed on the first surface 102 between a first component 104 and a second component 106 that are proximate each other to form an assembly. The first and second component 104, 106 are then transient liquid diffusion bonded to each other to form a structure 108 that has a bonding region 110 about the joint centerline X-X'. The bonding region 110 varies in composition from the centerline X-X' into the matrix of both the first and second component 104, 106.

In an exemplary embodiment, the composition of the diffusion aid comprises 12–93 wt. % palladium and a balance of at least one secondary element. The secondary element is selected from the group consisting of Ni, Co, and Fe, and corresponds to the secondary elements in the two-phase alloy. The palladium is present in the palladium-based alloy in an effective amount to lower a melting temperature of the palladium-based alloy below a melting temperature of the two-phase alloy.

In an exemplary embodiment, the two-phase material is a tungsten heavy alloy (WHA) and the diffusion aid material can be an alloy of palladium (Pd) and at least one secondary element selected from nickel (Ni), iron (Fe), and/or cobalt (Co). In an additional exemplary embodiment, the two-phase material is a WHA and the diffusion aid material can be an alloy of palladium and a secondary element of nickel. In a further exemplary embodiment, the two-phase material is a WHA and the diffusion aid material can be an alloy of palladium and at least one secondary element selected from Fe, Ni, and/or Co and the diffusion aid can have minor amounts of other elements. In another exemplary embodiment, the diffusion aid is Cu-free. The palladium content in the exemplary embodiments can be in the range of about (e.g., ±10%) 12 wt. % to 93 wt. % Pd.

A diffusion aid material melts and forms a liquid that can fill voids at the joint interface of the parent materials to be joined, e.g., the abutting surfaces of the components, and allows rapid diffusion of the parent material across the joint interface. The amount of palladium used in the diffusion aid is preferably the minimum necessary to lower the melting point of the diffusion aid alloy a sufficient amount below the melting point of the parent material matrix (e.g., at least 40–50° C. below the melting temperature of the parent matrix ($T_{m, parent\ matrix}$)) This allows good processing of the parent material and reduces or prevents slumping or distortion of the component due to softening or melting of the parent material. Accordingly, the palladium content is in the range of about (e.g., ±10%) 30 wt. % to 90 wt. %, preferably about (e.g., ±10%) 40 wt. % to 75 wt. %.

For example, WHA can vary in composition from at least 80–90 wt. % W to about (e.g., ±10%) 95 wt. % W and the balance Ni, Fe and/or Co. WHA is a two-phase alloy or metal-matrix composite consisting of almost pure tungsten grains surrounded by a matrix that consists of an alloy of tungsten with secondary elements (e.g., Ni, Fe, and/or Co). Typical values for $T_{m, parent\ matrix}$ for WHA are in the range of 1440° C. to 1480° C. Therefore, the amount of palladium used in the diffusion aid can be an effective amount to result in the liquidus temperatures for the diffusion aid alloy being about (e.g., ±10%) 50° C. to 10° C. below the melting point of the parent material matrix alloy, i.e., in the range from about (e.g., ±10%) 1390° C. to 1470° C. for WHA. Preferably, the amount of palladium used in the diffusion aid is in an effective amount to result in a liquidus temperature in the range of from 110° C. to 240° C. below the melting point of the parent material matrix alloy, i.e, about (e.g., ±10%) 1200° C. to 1370° C. for WHA. Compositions near the midpoint of the 30 wt. % to 90 wt. % Pd range give the lower liquidus temperatures with attendant processing flexibility. In addition, in the process for joining WHA parent material, the melting, mixing, and diffusing is primarily confined to the diffusion aid and the parent material matrix alloy and not the solid tungsten particles present in the WHA parent material.

The secondary elements in the diffusion aid can be selected from Ni, Co, and/or Fe. In an exemplary embodiment, the secondary element is Ni. In this embodiment, Ni is present in a ratio of Pd:Ni of approximately (e.g., ±10%) 6:4. For example, the diffusion aid has a composition of 60 wt. % Pd and 40 wt. % Ni. In another exemplary embodiment, the secondary elements are Ni and Fe. Here, the secondary elements are present in a ratio of Pd:Ni of approximately (e.g., ±10%) 6:4, although a range of 4:6 to 6:2 is possible, and a ratio of (Pd+Ni):Fe in the range of 7:3 to 9:1, preferably approximately (e.g., ±10%) 8:2. Examples of diffusion aids include compositions of 53 wt. % Pd-36 wt. % Ni—11 wt. % Fe and 48 wt. % Pd—32 wt. % Ni—20 wt. % Fe.

In an exemplary embodiment, the types and amounts of the secondary elements in the diffusion aid material are selected to correspond to the secondary elements in the parent material matrix alloys of the components. For example, a WHA parent material had a composition of 90 wt. % W, 8 wt. % Ni, and 2 wt. % Fe. An exemplary diffusion aid material was selected based on the composition of the WHA parent alloy to have a composition of 48–80 wt. % Pd and the balance secondary elements of Ni and Fe, in which the ratio, in wt. %, of (Pd+Ni):Fe was 8:2. The selection of secondary elements and the amount of secondary elements can be selected by a similar process in which the secondary elements are present in a ratio consistent with the ratio of the secondary elements in the parent material matrix alloys, i.e, consistent with the ratio of the secondary elements in the two-phase alloy or WHA parent matrix.

Iron addition to the diffusion aid can bring the composition closer to that of the parent material matrix by reducing the iron depletion in the bonding region. Reducing the iron depletion can increase ductility and toughness by reduction or elimination of possible formation of intermetallics at grain interfaces that can be found in nickel-rich matrix compositions. Reducing the iron depletion can also increase ductility and toughness by reducing the solubility of tungsten in nickel-rich matrix compositions. Reducing the iron depletion in conjunction with reducing some of the palladium can also reduce the tendency for tungsten grain agglomeration and increase the length of the processing time window in a thermal treatment portion of the transient liquid diffusion bonding process. Reducing the iron depletion can also increase the melting point of the diffusion aid material by about (e.g., ±10%) 15° C. to 40° C., which can be considered in the thermal treatment.

The diffusion aid material can be utilized as a bonding agent to join opposing surfaces of a first component and second component of a two-phase alloy. In an exemplary embodiment, opposing surfaces of the components can be prepared by, for example, machining the surfaces smooth and/or flat and cleaning the surfaces. Alternatively, the opposing surfaces can have corresponding interlocking elements or orientation or assembly landmarks to provide, for example, a feature to the opposing components to assist with assembly of the components.

The diffusion aid material is disposed between the first component and the second component at the joint to form an assembly, e.g., an unbonded arrangement of diffusion aid and components, each formed of a two-phase metal alloy. The components are maintained in contact with the diffusion aid material therebetween. The diffusion aid material can be disposed in various suitable ways.

In one aspect, the diffusion aid material can be in the form of a foil. An exemplary foil is approximately (e.g., ±10%) at least 3 mils (1 mil=1 one thousandth of an inch) thick, preferably greater than or equal to 6 mils.

In another aspect, the diffusion aid material can be in the form of a coating deposited on one or both of the opposing surface. Exemplary coatings can be either a solid coating, such as a continuous layer of diffusion aid material, or can be a powder coating, such as a layer of diffusion aid material in the form of a powder. Individual granules of the powder can have the composition of the diffusion aid, e.g, be a powder formed from a casting of diffusion aid and milled to <1–2 mils in diameter or <+270 mesh. Alternatively, individual granules of the powder can have an elemental composition and the aggregate presence of the individual granules of any one elemental composition is consistent with the palladium and secondary element composition and ratios. Exemplary suitable deposition techniques for the coating includes electroplating, vacuum deposition, plasma spraying, chemical vapor deposition (CVD) or physical vapor deposition (PVD) techniques. Exemplary coating thicknesses can be approximately (e.g., ±10%) at least 3 mils, preferably at least 6 mils, thick.

In a still further aspect, the diffusion aid can be in a mixed form, such as a foil and a coating, or two or more foils of the same or different compositions. In an example of this last aspect, diffusion aid of Pd/Ni in the form of a foil was placed at the joint. A second foil of Fe was also placed at the joint proximate the Pd/Ni foil, e.g., overlapped. Thus, upon bonding, the Pd/Ni foil melted first and contributed to melting the Fe foil with a resulting diffusion aid aggregate composition of Pd/Ni/Fe. The aggregate composition of the composite foils was consistent with the palladium and secondary element compositions and ratios.

In an exemplary embodiment, with the joint plane in the horizontal position, however, bonding can be carried out in any orientation of the components in which the components are maintained in contact and/or maintained in a fixed orientation. For example, a constant force can be applied to the joint interface in any orientation to maintain contact between the components and/or maintain the components in a fixed orientation. The constant force can be normal or substantially normal (e.g., within ±30° of normal) to the joint interface or a portion of the joint interface or the surface or a portion of the surface on which the diffusion aid is disposed. The applied force can be about (e.g., ±10%) 2–14 psi, preferably 3–8 psi, although the force of gravity acting on the components can provide sufficient force when the joint interface is suitably oriented. In alternative orientations and/or where the design of the part is such that applying pressure can be difficult, the force can be applied by a secondary apparatus or other suitable means, such as clamps, vices, push rods, springs, differential expansion fixtures, rams, and so forth. Such secondary apparatus and secondary means can be designed to operate at the elevated temperatures and in the atmosphere used during the thermal cycle.

The assembly formed from the components and diffusion aid is then subjected to a thermal treatment to form a structure, e.g., a first component, a second component, and a bond between the first and second components. An exemplary thermal treatment includes at least one thermal cycle during which the temperature of the diffusion aid is increased to a predetermined temperature and the applied force is maintained on the joint. The predetermined temperature is above the melting point of the diffusion aid material but below the melting point of the matrix of the component material being joined. During the bonding process, the palladium of the diffusion aid material diffuses into the surrounding parent material with a resulting reduction of the palladium concentration in the diffusion aid material and an increase in the palladium concentration in the matrix of the component alloy. Accordingly, the melting point of at least the matrix of the component alloy in the bond region is depressed by the palladium resulting in a transient liquid phase which further facilitates the penetration and intermixing of the matrix of the component and the diffusion aid material. In exemplary embodiments, the diffusion aid material diffuses into the surrounding parent material to a depth of at least 5 mils, preferably greater than or equal to 10 mils.

The variation in the composition across the bonding region 110 is shown in FIG. 2, which shows an EDAX (Energy Dispersive Analysis of X-rays) composition measurement across an exemplary 60Pd-40Ni diffusion aid transient liquid diffusion bond of WHA components. As shown in FIG. 2, the composition variation is continuous, i.e., no step-wise variations, and shows evidence of diffusion into the matrix of the component, i.e., the composition varies a distance from the centerline of the bonding region into the matrix. Here, a 6 mil foil diffusion aid has resulted in a bonding region of approximately (e.g., ±10%) 25 mil (>12 mil on each side of the centerline).

The thermal cycle can be conducted using any suitable heating means. For example, the heating means can be resistive heating by, for example, using a resistive heating wrap. Alternatively, the heating can be RF heating, radiative heating, conductive heating, and so forth. Any portion of the assembly can be heated that results in the desired temperature being applied to the assembly. For example, the assembly can be heated in the region of the joint, the components adjacent the joint area can be heated, or the entire assembly can be heated.

In exemplary embodiments, heating occurred in a furnace, such as a partial vacuum furnace. The assembly can be placed directly on the furnace grid or elevated to provide uniform thermal treatment to each of the joints in a multiple joint assembly. Further, contamination of the assembly during the thermal treatment can be minimized by, for example, using a furnace with a clean, cold-wall radiation shield as opposed to refractory materials.

In an additional aspect, the thermal cycle or a portion of the thermal cycle is conducted in the presence of wet hydrogen. For example, a wet hydrogen atmosphere can be placed in at least the vicinity of the diffusion aid. The wet hydrogen atmosphere can range from at least 3–4 torr to atmospheric pressure. In one exemplary embodiment, the wet hydrogen atmosphere can be provided by bubbling hydrogen gas through water prior to its introduction in the vicinity of the diffusion aid material. In an additional aspect, the assembly can be heated in a hydrogen atmosphere furnace to eliminate or minimize the presence of oxides.

The temperature of the assembly is maintained for a predetermined time period. The exact time period depends on the component size and the temperature employed for the thermal cycle. For example, at a higher temperature (e.g., farther above the melting temperature of the diffusion aid material) a shorter time period can be employed because the transient liquid diffusion bonding process occurs more quickly (e.g., the diffusion aid melts and diffuses into the matrix with a thermal driving force). Likewise, at a lower temperature (e.g., closer to the melting point of the diffusion aid) a longer time period can be employed because the transient liquid diffusion bonding process occurs more slowly (e.g., the diffusion aid melts and diffuses into the matrix under a lower thermal driving force). Typical time periods can be from approximately (e.g., ±10%) 0.5 hours to 4 hours, for example, a time period of 2–4 hours.

After the thermal cycle, the structure is allowed to cool to ambient temperatures. Both ambient cooling and forced cooling can be used.

Thermal uniformity within the components and the assembly during the bonding process can contribute to better bond performance and structure mechanical properties. For example, in structures formed from assemblies placed on a thermally conductive stage within a partial vacuum furnace, the stage acted as a heat sink. This contributed to a lower temperature in the lower portion of the assembly. Subsequent mechanical testing of the structure revealed lower than expected tensile test and elongation results. In contrast, structures formed from assemblies placed within the furnace such that the thermal conditions were relatively uniform throughout the assembly exhibited expected or better than expected mechanical properties.

For joining of the majority of two-phase materials having nickel-based matrices with smaller amounts of iron and/or cobalt, the palladium-based aid material has several advantages over the prior aid materials, such as copper. For example in WHA, palladium forms a complete solid solution, with no secondary phases, with both nickel and cobalt and with iron at temperatures above about (e.g., ±10%) 900° C. Furthermore, palladium in all proportions with nickel has the same face centered cubic crystal structure as the typical matrix alloy in a WHA. Palladium also forms solid solution alloys with tungsten in a manner very similar to nickel. The palladium-based aid alloy behaves in a bonded WHA structure in a manner very similar to the WHA matrix. One exemplary advantageous property of the palladium-based aid alloys includes a melting point in the range of 1200° C. to 1280° C. Other potential ductile, solid-solution-forming elements with nickel produce alloys that have melting points above the melting points of the materials being joined, making them less desirable for diffusion bonding of these lower melting point materials.

Using Pd/Ni and Pd/Ni/Fe diffusion aid materials and processes, transient liquid diffusion bonding of WHA components was carried out using peak bonding temperatures in the range of 1350° C. to 1420° C. for times of 0.5 to 4 hours, for example, at a peak temperature of 1400° C. for 2–4 hours.

A structure was produced from components formed from WHA with 90 wt. % W, 8 wt. % Ni, and 2 wt. % Fe by transient liquid diffusion bonds using Pd—Ni diffusion aid with 48 to 80 wt. % Pd and the balance secondary elements of Ni and/or Fe. The bonds were produced between cylindrical components with diameters ranging from 0.6 to 15 inches and assemblies containing up to five bonds. The bonds in the resulting structure were tested for mechanical properties including yield strength, ultimate strength, and % elongation. Small bars with bonds using 6 and 9 mil diffusion aids were also swaged to a 15% reduction in area, demonstrating the ductility of the bond region during plastic deformation.

In one example, assemblies were diffusion bonded using a 9 mil thick Pd/Ni diffusion aid. The assemblies consisted of two 15 inch diameter disks joined together to form a bottom bond. Three 10" diameter disks were joined coaxially on the top of the 15 inch diameter disks. Overall, each assembly had three bonds and an overall assembly height of 20 inches. The assemblies were then transient liquid diffusion bonded to each form a unitary structure.

To assess the quality of the bonds in the first structure, four chords of the 15 inch section were cut in the axial direction at the location of the 10 inch diameter. Eleven tests of samples taken from the 15 inch bond exhibited elongations ranging from 20% to 33%. Six tests of samples taken from the three 10 inch diameter bonds exhibited elongations that ranged from 31% to 40%.

Two chordal slices along the entire height of the structure were removed to supply tensile specimens for mechanical testing. Two to four tensile tests were conducted on each of the five bonds. The tests had elongations ranging from 20% to 38%. In addition, the 0.63" diameter witness bar had an elongation of 24%.

In a further example, a structure with a single joint between 5 inch diameter components was prepared using a foil Pd/Ni diffusion aid. The diffusion aid foil was 9 mils in thickness. Four tests along this bond produced elongations between 36% and 40%.

In another example, two compositions of Pd/Ni/Fe diffusion aid were tested in structures. In a first composition, the diffusion aid was 53Pd-36Ni-11Fe and in a second composition, the diffusion aid was 48Pd-32Ni-21Fe. The first diffusion aid had a Ni:Fe ratio of approximately (e.g., ±10%) 8:2.4, near the same ratio as the parent two-phase WHA. The second diffusion aid had a (Pd+Ni):Fe ratio of 8:2, e.g., treating Pd as the equivalent of Ni in the ratio. Both compositions have a Pd:Ni ratio of approximately (e.g., ±10%) 6:4, the same as the 60Pd/40Ni eutectic, in order to have a low melting point.

Test results on structures formed from assemblies bonded with the first composition, 53Pd-36Ni-11Fe, included a tensile yield of 87 ksi, an ultimate tensile strength of 139 ksi, and an elongation of 28%, essentially identical to the parent two-phase WHA. 8 mm Charpy smooth bar toughness values were 6 and 7 ft-lbs, in contrast to the 5 ft-lbs typical of the 60Pd-40Ni composition bonded joints, but less than the 100 ft-lbs typical of the WHA component materials.

Test results on structures formed from assemblies bonded with the second composition, 48Pd-32Ni-21Fe, included a tensile yield of 87 ksi, an ultimate tensile strength of 139 ksi, and an elongation of 27%, again essentially identical to the parent two-phase WHA. 8 mm Charpy smooth bar toughness values were 25 and 26 ft-lbs, an improvement over the 5 ft-lbs typical of the 60Pd/40Ni composition. Thus, structures bonded using this composition can have bonds with five times the toughness of the 60Pd-40Ni bonds.

Examples formed using a Pd/Ni/Fe diffusion aid bond by adding a separate amount of pure Fe foil between the appropriate amount of the 60Pd-40Ni foil were used in the first and second structures. The 60Pd-40Ni foil melted and dissolved the higher melting point Fe foil early in the transient liquid diffusion bonding process to form a Pd/Ni/Fe bond.

A tungsten heavy alloy structure formed using the exemplary methods can include an interior volume formed by the bonding of the first and second component.

One, two, or more components of tungsten heavy alloy (WHA) can be bonded by a Pd/Ni/Fe diffusion aid diffusion bonding process to form a structure. For example, a first component and a second component, each formed of a liquid phase sintered (LPS) WHA material can be joined using a Pd/Ni/Fe diffusion aid.

The individual components can take any form including half shapes, quarter shapes, irregular shapes, and so forth. For example, a WHA structure can be substantially in the form of a storage vessel, container, or other structure with an interior volume. Examples of structures that can be formed by applying the exemplary method include pressure vessels, reentrant cavities, or shielding structures for electromagnetic radiation. The surfaces of the individual components can suitably mate with each other with the diffusion aid in between. Further, the WHA structure can have an opening to the interior volume. The opening can be either permanently opened or resealable, as with a threaded or unthreaded plug, cap, cover or other suitable resealing element.

Although described above using WHA as the parent material matrix alloy for components in the assembly, any two-phase alloy or WHA can be used and the individual components to be bonded do not have to be made of the same alloy. It is sufficient that the parent material formed into the components has alloying elements that are sufficiently compatible so that the matrix alloys diffuse under the process conditions and form the bond.

While the present invention has been described by reference to the above-mentioned embodiments, certain modifications and variations will be evident to those of ordinary skill in the art. Therefore, the present invention is to be limited only by the scope and spirit of the appended claims.

What is claimed is:

1. A method of making a composition for bonding to a two-phase alloy, the two-phase alloy comprising at least one secondary element, the method comprising:
   selecting at least one secondary element from the group consisting of Ni, Co, and Fe, the at least one secondary element corresponding to the secondary element in the two-phase alloy; and
   forming a palladium-based alloy comprising 12–93 wt. % palladium and balance the selected secondary element, wherein palladium is present in the palladium-based alloy in an effective amount to lower a melting temperature of the palladium-based alloy below a melting temperature of the two-phase alloy.

2. The method of claim 1, wherein the two-phase alloy is a tungsten heavy alloy.

3. The method of claim 1, wherein the palladium-based alloy comprises 30–80 wt. % palladium.

4. The method of claim 3, wherein the palladium-based alloy comprises 40–75 wt. % palladium.

5. The method of claim 1, wherein the melting temperature of the palladium-based alloy is at least 50° C. below the melting temperature of the two-phase alloy.

6. The method of claim 1, wherein a ratio of secondary elements in the palladium-based alloy is substantially the same as a ratio of corresponding secondary elements in the two-phase alloy.

7. A structure comprising:
   a first component;
   a second component, wherein each of the first component and the second component are formed of a two-phase alloy having at least one secondary component; and
   a bond between the first and second components formed by the composition for bonding made by the method of claim 1, the comprising 12–93 wt. % palladium and balance at least one secondary element selected from the croup consisting of Ni, Co, and Fe, the at least one secondary element corresponding to the secondary element in the two-phase alloy.

8. The structure of claim 7, wherein the two-phase alloy is a tungsten heavy alloy.

9. The structure of claim 7, wherein the first and second components are formed using a two-phase alloy and the bond has a value of a mechanical property of at least a value of a corresponding mechanical property of the two-phase alloy.

10. The structure of claim 9, wherein the mechanical property is at least one of yield strength, ultimate tensile strength, and elongation.

11. The structure of claim 7, wherein each of the secondary elements is selected to correspond to a secondary element in at least one of the first and second two-phase alloys.

12. The structure of claim 7, wherein a ratio of secondary elements in the palladium-based alloy is substantially the same as a ratio of corresponding secondary elements in at least one of the first and second two-phase alloys.

13. The structure of claim 7, wherein the structure has an interior volume.

14. The structure of claim 13, comprising an opening to the interior volume.

15. The structure of claim 14, wherein the opening is resealable.

16. The structure of claim 13, wherein the structure is a storage vessel or a container.

17. The structure of claim 13, wherein the structure is a pressure vessel, a reentrant cavity, or a shielding structure for electromagnetic radiation.

* * * * *